Figure 1:
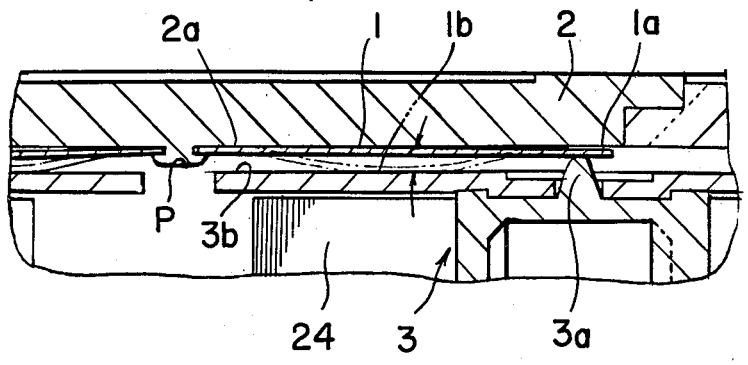

United States Patent [19]

Goto

[11] 4,368,860
[45] Jan. 18, 1983

[54] MAGNETIC RECORDING TAPE CASSETTE

[75] Inventor: Shinichi Goto, Takatsuki, Japan

[73] Assignee: Hitachi Maxell, Ltd., Osaka, Japan

[21] Appl. No.: 213,112

[22] Filed: Dec. 4, 1980

[30] Foreign Application Priority Data

Dec. 6, 1979 [JP] Japan .......................... 54-169596[U]
Dec. 29, 1979 [JP] Japan .......................... 54-181636[U]

[51] Int. Cl.³ .................... G03B 1/04; G11B 15/32
[52] U.S. Cl. ................................ 242/199; 242/197
[58] Field of Search ............................. 242/192–200;
360/93, 96, 132; 206/389

[56] References Cited

U.S. PATENT DOCUMENTS

| 2,676,766 | 4/1954 | Ross et al. ................................ 242/76 |
| 3,941,333 | 3/1976 | Carpenter et al. ................... 242/197 |
| 4,078,657 | 3/1978 | Schurman ............................. 206/387 |

FOREIGN PATENT DOCUMENTS 5542385 3/1980 Japan ................................... 242/199

Primary Examiner—Leonard D. Christian

Attorney, Agent, or Firm—Birch, Stewart, Kolasch & Birch

[57] ABSTRACT

In a magnetic recording tape cassette comprising a bottom case, a top case assembled with the bottom case to provide a tape chamber, one or more of tape roll members mounted in the tape chamber in position, each of which includes a hub with a top projection for pivoting the hub and being mounted on the bottom wall of the bottom case and a magnetic recording tape wound on the hub, and a resilient spring member fixed to the undersurface of the top wall of the top case and having one or more of arms with the free ends thereof extending to the top projection of the corresponding hubs to resiliently rotatably support the hubs in position, the improvement comprises a recess defined in the undersurface of the top wall of the top case for accommodation of the fixed part of the spring member, said recess having a depth substantially equal to or larger than the thickness of the spring plate, said recess extending to at least a position corresponding to the maximum diameter of the tape roll member from the position where the spring plate is fixed.

7 Claims, 8 Drawing Figures

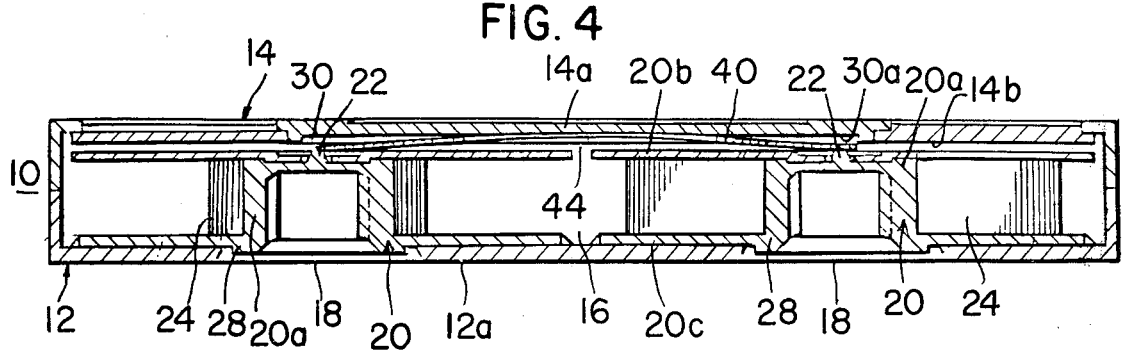
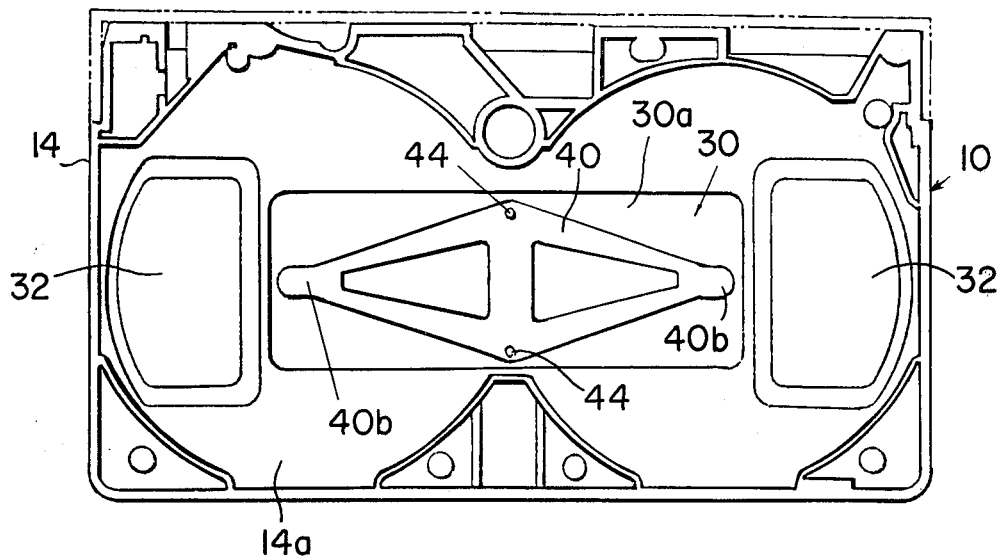
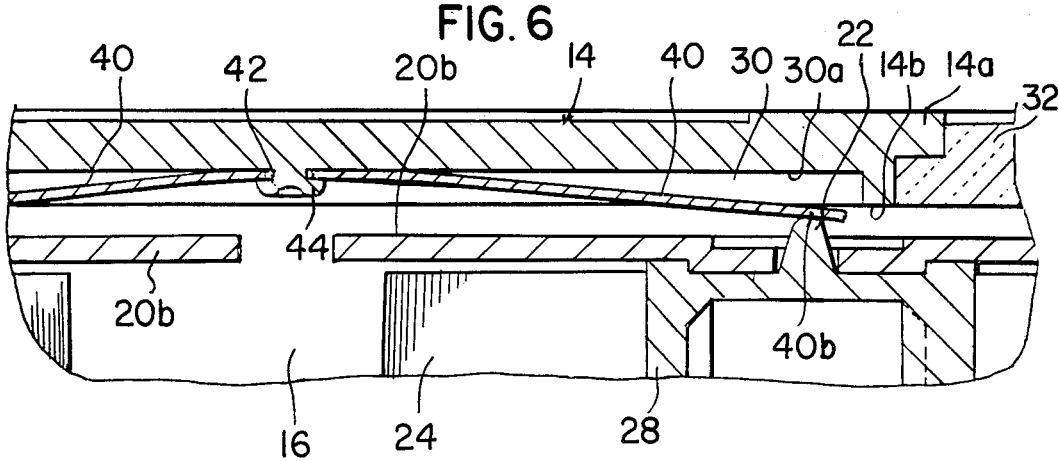

MAGNETIC RECORDING TAPE CASSETTE

The present invention relates to a magnetic recording tape cassette and, more particularly to a tape cassette comprising a top case, a bottom case assembled with the top case, one or more of tape hubs and a resilient spring plate fixed to the undersurface of the top wall of the top case of the cassette for rotatably supporting the tape hubs.

Japanese Utility Model Application No. 140846/1974 (Tokkai Sho 51-66422) discloses a magnetic recording tape cassette for recording video signals, namely so-called video tape cassette, wherein a spring plate is fixed to the undersurface of the top wall of the top case at the intermediate portion of the spring plate with its opposite free ends protruding away from the top wall so that, when the top case and the bottom case are assembled, they can apply biasing forces to the respective tape reels to retain the latter in position within the cassette.

FIG. 1 shows an essential portion of a conventional arrangement for supporting the tape reels by the spring plate in a conventional video tape cassette, wherein the spring plate 1 is fixed to the undersurface of the top case 2 at P and the free ends 1a of the spring plate 1 rotatably contact on the top end of a pivotal projection 3a of a tape reel 3.

Figure 2:
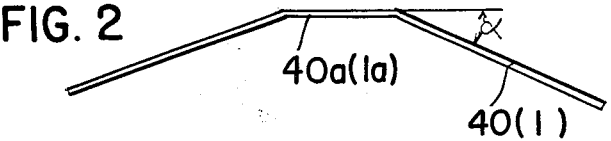

In order to apply a biasing force on the projection 3a the spring plate 1 is preliminarily bent with a suitable angle α at both sides of intermediate portion 1a as shown in FIG. 2.

On the other hand, in attempting to decrease the height of a tape cassette, a gap between the top face 3b of the tape reel 3 and the undersurface 2a of the top case 2 may become small, so that when the top case 2 with the spring plate 1 attached in position is assembled with the bottom case, the free end 1a is excessively displaced in an upward direction, whereby the spring plate 1 is undesirably deformed in an arcuated form as shown in the dotted lines in FIG. 1. Then the arcuated portion 1b of the spring plate 1 thus deformed is apt to contact the top face 3b of the tape reel 3 thereby preventing the smooth rotation thereof.

Therefore, an essential object of the present invention is to eliminate such drawbacks as mentioned above and to provide a magnetic recording tape cassette having a spring plate for supporting the respective tape reels in position in which the spring plate acts to support the tape reel without undesired deformation of the spring plate when the gap is decreased between the undersurface of the top case and the top face of the reel, whereby the height of the magnetic tape cassette can be decreased.

Figure 3:
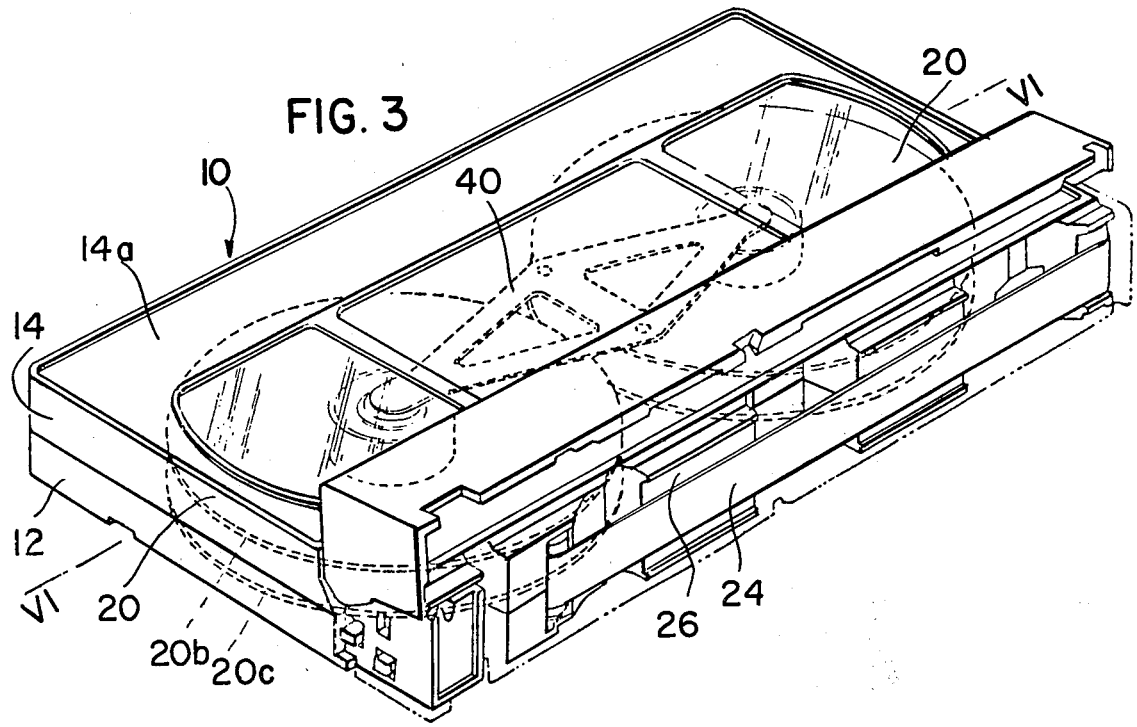
Figure 7:
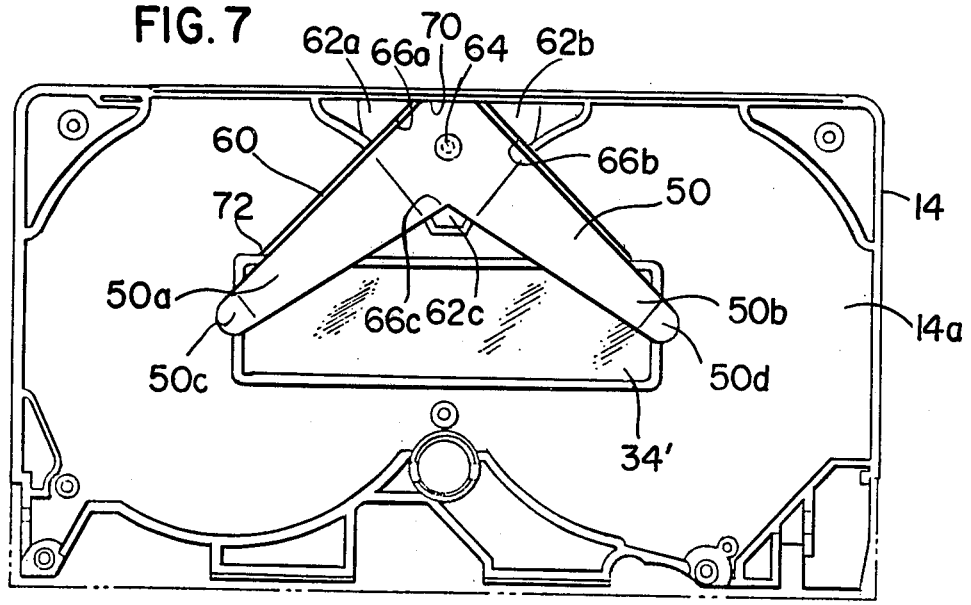
Figure 8:
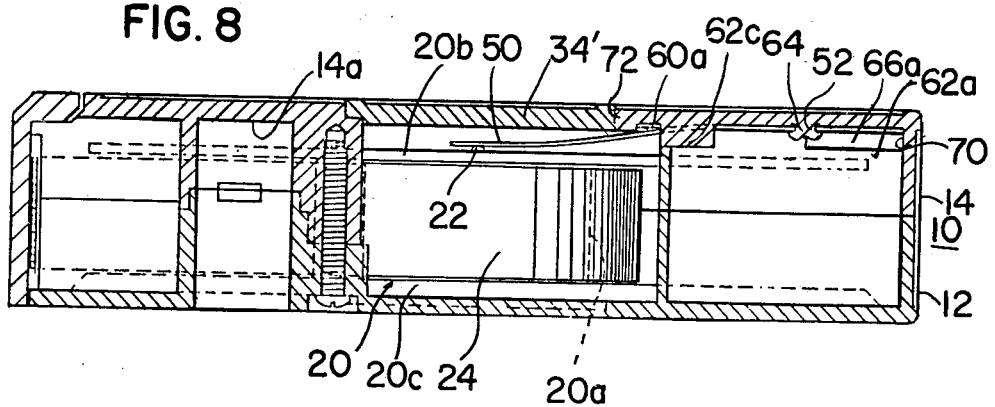

The present invention will be hereinafter fully described in conjunction with the preferred embodiments of a magnetic recording tape cassette with reference to the attached drawings in which:

FIG. 1 is a partial cross sectional view of a conventional magnetic recording tape cassette, FIG. 2 is a front view of an example of a spring plate employed in the magnetic recording tape cassette, FIG. 3 is a perspective view of an embodiment of a magnetic recording tape cassette according to the present invention, FIG. 4 is a cross sectional view taken along the lines VI—VI in FIG. 3, FIG. 5 is a plan view showing inside the top case of the embodiment shown in FIG. 3 with a spring plate attached, FIG. 6 is an enlarged partial cross sectional view of the essential portion of FIG. 4, FIG. 7 is a plan view showing inside the top case of another embodiment of a magnetic recording tape cassette according to the present invention, and FIG. 8 is a cross sectional view of the embodiment shown in FIG. 7.

Referring to FIG. 3, a video tape cassette 10 comprises a bottom case 12 and a top case 14 assembled with the bottom case 12 to provide a tape chamber 16 in which a pair of tape reels 20 are accommodated in a known manner. The bottom case 12 and the top case 14 are made of a plastic resin such as polystylene. A magnetic recording tape 24 are wound on the tape reels 20 and the intermediate portion thereof is stretched between the reels 20 running along the front face 26 of the tape cassette 10.

Each of the tape reels 20 comprises a hub 20a for winding said magnetic recording tape 24 therearound and a pair of flanges 20b, 20c fixed co-axially with the hub 20a on the both top and bottom ends thereof for protection of the upper and lower edges of the magnetic recording tape 24.

In the example of the embodiment shown, the lower flange 20c is integrally molded with the hub 20a in one time by polyacetal and the transparent upper flange 20b of polyethylene is fixed on the top end of the hub 20a by caulking.

Each of the tape reels 20 are mounted on the bottom wall 12a with its annular projection 28 engaged within the opening 18 defined in the bottom wall 12a of the bottom case 12.

As shown in FIG. 4 and FIG. 5, a recess 30 in a rectangular shape in a horizontal view is formed in the middle portion of the undersurface 14b of the top wall 14a of the top case 14 for accommodation of a resilient spring plate 40 for supporting the top projections 22 of the tape reels 20 as hereinafter explained. The recess 30 has a depth substantially equal to or larger than a thickness of the spring plate 40 which is made of a stainless steel and is formed in a generally elongated diamond configuration. The recess 30 extends to a position near the windows 32 defined in the top wall 14a of the top case 14.

Said spring plate 40 is fixed to the inner surface 30a of the recess 30 at its central portion in such a manner that two holes 42 defined at the central flat portion 40a of the spring plate 40 are fitted with the corresponding projections 44 formed on the center of the recess 30 then the projections 44 are caulked.

Said spring plate 40 is preliminarily bent with an angle α of such as 5°–30° at the both sides of the central flat portion 40a in a similar manner as shown in FIG. 2, thus, the both free end portions 40b of the spring plate 40 are protruded downward away from the undersurface 14b of the top wall 14a.

With the arrangement as described above, when the top case 14 having the spring plate 40 is assembled with the bottom case 12 in a known manner, both of the free ends of the spring plate 40 contact the corresponding top projections 22 of the respective tape reels 20 biassing the tape reels 20 downwardly by the forces applied from the spring plate 20 due to the resilient deflection of both free ends thereof, so that the tape reels 20 are retained in position.

It is appreciated that the spring plate 40 is accommodated within the recess 30 so that the central portion 40a of the spring plate 40 is positioned higher than the position of the conventional spring arrangement as shown in FIG. 1, when the top case and the bottom case 12 are assembled. Accordingly, the both free ends 40b of the spring plate 40 are not excessively displaced in an upward direction when they are pushed by the top projections 22, whereby a deformation of the intermediate portion between the central portion 40a and the free end 40b of the spring plate 40 in a downward direction as shown in FIG. 1 can be prevented, thereby allowing the tape reels 20 to rotate easily.

Preferably, the recess 30 extends to at least such a position situated within a circle corresponding to the peripheral edge of the tape reel or such a position situated within a circle of a diameter when the magnetic recording tape is supposed to be wound to a maximum in the case where the magnetic recording tape is wound on a hub without using the reel. By this limitation of the position of the end of the recess, the spring plate is not undesirably deformed as shown in FIG. 1.

FIGS. 7 and 8 show another embodiment of the present invention wherein a bifurcated spring plate 50 in the form of a V character is employed for supporting the tape reels 22 in position. In this embodiment, there is formed a generally V shaped recess 60 in the center of the top wall 14 of the top case 14 in such a manner that the recess 60 extends radially from the backward edge portion 70 up to the edge 72 of the window 34' which is a position corresponding to the cylindrical peripheral face of the hub 20a. The shape of the recess 60 is generally complementary to the shape of the V shaped spring plate 50 and the depth of the recess 60 is substantially equal to or larger than the thickness of the spring plate 50 so that the spring plate 50 is accommodated within the recess 60.

The spring plate 50 is fixed to the innersurface 60a of the recess 60 with a hole 52 defined at the central portion of the spring plate fitted to the projection 64 and caulked. Thus, the both arms 50a and 50b of the spring plate 50 extend radially along the V shaped recess 60 and the free end portions 50c and 50d thereof are protruded away from the top wall 14a so as to contact the top projections 22 of the tape reels 20 applying biassing forces to the respective tape reels 20 to retain them in position.

A pair of positioning member 62a and 62b are projected from the top wall 14a of the top case 14 at the both outsides of the bifurcated base portion of the recess 60 and further positioning member 62c is projected from the top wall 14a inside the difurcated base portion.

The positioning members 62a-62c has a guide wall 66a through 66c to facilitate the mounting of the spring plate 50 into the recess 60.

As the spring plate 60 is accommodated in the recess 50, a similar advantage explained with reference to the first embodiment can be obtained.

It is another advantage of the present invention that the recesses 30 and 60 provided in the top case act as a guide member for preventing the respective spring plates 40 and/or 50 from undesired rotation or displacement caused by the rotation of the tape reels.

It is noted that the use of the tape reel having a hub with a pair of flange is not essential but only hub without such a pair of flanges can be used for winding a magnetic recording tape to provide a tape roll member.

It is further noted that only one single tape roll member in one tape cassette can be in the scope of the present invention.

What is claimed is:

1. A magnetic recording tape cassette comprising, a bottom case and a top case, said bottom case being assembled with said top case to provide a tape chamber therebetween, one or more tape roll members mounted in the tape chamber on the bottom wall of the bottom case, each of said tape roll members including a hub having a magnetic recording tape wound thereon and provided with a top projection for pivoting the hub, a resilient spring-biased member fixed to the undersurface of the top wall of the top case and having one or more arms with the free ends thereof extending to the top projection of the corresponding hubs to resiliently, rotatably fix the hubs in position, and a recess disposed in the undersurface of the top wall of the top case for accommodating the fixed portion of the spring member, said recess having a depth substantially equal to or larger than the thickness of the spring plate so as to position the resilient spring member to prevent contact of the intermediate portion of the resilient spring member onto the top surface of the tape roll member, said recess extending to at least a position corresponding to the maximum diameter of the tape roll member.

2. The magnetic recording tape cassette according to claims 1, wherein two tape roll members are provided in the tape chamber and the resilient spring member is fixed to the top wall of the top case at the central portion thereof with the two free ends thereof engaging the top projections of both of the hubs.

3. The magnetic recording tape cassette according to claim 1, wherein the tape roll member comprises a tape reel.

4. The magnetic recording tape cassette according to claim 1, wherein the resilient spring member has a generally elongated diamond configuration.

5. The magnetic recording tape cassette according to claim 1, wherein the resilient spring member has a pair of bifurcated arms.

6. The magnetic recording tape cassette according to claim 1, wherein the recess extends to a position corresponding to the cylindrical outer peripheral surface of the hub.

7. The magnetic recording tape cassette according to claim 1, wherein the resilient spring member is a spring plate having a substantially V-shpaed configuration and extending from the wall of the cassette to the top projection of the respective hubs, and the recess has a shape which is complementary to the shape of the spring plate.

* * * * *